US008712468B1

(12) United States Patent
Li

(10) Patent No.: US 8,712,468 B1
(45) Date of Patent: Apr. 29, 2014

(54) MOBILE DEVICE MODE CONTROL BASED ON DUAL MAPPING OF AVAILABILITY (PRESENCE) INFORMATION

(75) Inventor: Shunge Li, Duluth, GA (US)

(73) Assignee: Cellco Partnership, Basking Ridge, NJ (US)

( * ) Notice: Subject to any disclaimer, the term of this patent is extended or adjusted under 35 U.S.C. 154(b) by 632 days.

(21) Appl. No.: 13/010,196

(22) Filed: Jan. 20, 2011

(51) Int. Cl.
*H04M 1/00* (2006.01)

(52) U.S. Cl.
USPC ................................................ 455/552.1

(58) Field of Classification Search
USPC ................................................ 455/552.1
See application file for complete search history.

(56) References Cited

U.S. PATENT DOCUMENTS

| | | | |
|---|---|---|---|
| 5,235,633 A | | 8/1993 | Dennison et al. |
| 5,546,445 A | | 8/1996 | Dennison et al. |
| 6,324,404 B1 | | 11/2001 | Dennison et al. |
| 6,400,956 B1 | | 6/2002 | Richton |
| 6,438,385 B1 | | 8/2002 | Heinonen et al. |
| 7,194,278 B1 | | 3/2007 | Cook |
| 7,200,387 B1 | | 4/2007 | Ephraim et al. |
| 7,653,385 B2 | | 1/2010 | Arend et al. |
| 8,019,875 B1 | * | 9/2011 | Nielsen .................... 709/227 |
| 2005/0221841 A1 | | 10/2005 | Piccionelli et al. |
| 2007/0071209 A1 | * | 3/2007 | Horvitz et al. ........ 379/201.06 |
| 2007/0143685 A1 | * | 6/2007 | Stillion et al. .............. 715/733 |
| 2007/0232278 A1 | * | 10/2007 | May ........................ 455/414.1 |
| 2007/0286366 A1 | * | 12/2007 | Deboy et al. ............. 379/93.17 |
| 2008/0120174 A1 | * | 5/2008 | Li ................................ 705/14 |
| 2009/0300504 A1 | * | 12/2009 | May .......................... 715/733 |
| 2009/0313109 A1 | | 12/2009 | Bous et al. |
| 2010/0093333 A1 | | 4/2010 | Friedenthal et al. |
| 2010/0125497 A1 | | 5/2010 | Arguello |
| 2010/0268592 A1 | | 10/2010 | Shaer |
| 2010/0318615 A1 | * | 12/2010 | Griffin ...................... 709/206 |
| 2011/0269439 A1 | * | 11/2011 | Griffin ...................... 455/415 |
| 2011/0319057 A1 | * | 12/2011 | Toebes et al. ............. 455/414.1 |
| 2012/0021750 A1 | * | 1/2012 | Vendrow et al. .......... 455/445 |
| 2012/0054032 A1 | * | 3/2012 | Kolodziej ................. 705/14.58 |
| 2012/0246582 A1 | * | 9/2012 | Leacock et al. ........... 715/753 |
| 2013/0108035 A1 | * | 5/2013 | Lyman .................. 379/218.02 |

OTHER PUBLICATIONS

Yowza.com. 2009. Popular Mobile Couponing App. Yowza!! Co-Created by Heroes' Star, Greg Grunberg, Launches Yowza!! Version 2.0 with Advanced Features and More Retail Partners. Press Release, dated Sep. 9, 2009, downloaded from https://getyowza.com/pr/releases/2009/09/1; 2009-2010.

(Continued)

*Primary Examiner* — Bobbak Safaipour

(57) ABSTRACT

An availability map may associate each of a plurality of different availability information indicators with one of a plurality of availability statuses. A user may set which availability status is associated with each of the availability information indicators. A mode map may associate each of a plurality of availability statuses with one or more operational modes of a communication system. A user may set which of the operational modes is associated with each of the availability statuses. A current availability status may be determined by equating a current availability information indicator with the availability status indicated in the availability map to be associated with this current availability information indicator. Current availability information indicators may come from sources including communication devices and external networked applications. Operational modes of the communication system may be set in accordance with the operational modes indicated in the mode map to be associated with the current availability status as determined.

17 Claims, 5 Drawing Sheets

(56) References Cited

OTHER PUBLICATIONS

U.S. Appl. No. 12/862,372, filed Aug. 24, 2010, entitled "Location Based Network Selection."

U.S. Appl. No. 12/870,412, filed Aug. 27, 2010, entitled "Detected Arrival at Navigated Destination Automatically Triggers Delivery of Relevant Local Information to User."

* cited by examiner

FIG. 4A

LOCATION TO AVAILABILITY STATUS

Office
○ Not available
◉ Always available
○ Available only for
  ☐ Family
  ☐ Friends

FIG. 4B

LOCATION TO AVAILABILITY STATUS

Home
○ Not available
○ Always available
◉ Available only for
  ☑ Family
  ☑ Friends

FIG. 4C

LOCATION TO AVAILABILITY STATUS

Church
◉ Not available
○ Always available
○ Available only for
  ☐ Family
  ☐ Friends

FIG. 4D

LOCATION TO AVAILABILITY STATUS

John's condo
○ Not available
○ Always available
◉ Available only for
  ☐ Family
  ☑ Friends

FIG. 6A

CONTACT AVAILABILITY STATUS TO MODE

John Smith
Always available
☑ Provide notification . . .
☐ Send message . . .
☐ Auto reply . . .
☐ Loud ringer

FIG. 6B

CONTACT AVAILABILITY STATUS TO MODE

John Smith
Not available
☐ Provide notification . . .
☑ Send message . . .
☐ Auto reply . . .
☐ Loud ringer

FIG. 6C

CONTACT AVAILABILITY STATUS TO MODE

Jack Johnson
Not available
☐ Provide notification . . .
☐ Send message . . .
☑ Auto reply . . .
☐ Loud ringer

FIG. 6D

CONTACT AVAILABILITY STATUS TO MODE

Jack Johnson
Available only for family
☐ Provide notification . . .
☐ Send message . . .
☐ Auto reply . . .
☑ Loud ringer ial Field This disclosure relates to setting operational modes on communication devices, such as whether a call to a cell phone should trigger a ringer, whether a Bluetooth and/or Wi-Fi transceiver should be activated, whether a reply message should be automatically provided in response to an incoming communication, and/or whether information about the location of the communication device should automatically be provided.

2. Description of Related Art

Communication devices, such as smart cell phones, may offer their users a broad variety of operational mode settings. These can include, for example, settings relating to whether and how incoming phone calls should be announced, whether a Wi-Fi and/or Bluetooth transceiver should be activated, whether replies should automatically be sent in response to incoming communications, and/or whether information about the location of a mobile communication device should automatically be provided.

Settings which a user chooses may not be appropriate for all circumstances. For example, a user may want a ringer disabled while in a meeting, but not while working in the office. Similarly, a user may want a Wi-Fi transceiver enabled while at an airport, but not while driving.

The circumstances which can warrant a change in operational mode settings can vary widely. When multiplied by the number of operational mode settings and the number of possible different circumstances, both the number and frequency of operational mode changes which a user must make to keep his communication device optimized may be very substantial. The burden and complexity of constantly maintaining this optimization can dissuade many users from doing so, thus reducing the effectiveness which their communication device might otherwise have.

SUMMARY

A communication device may include a user interface, an availability retrieval system, and a communication system. The user interface may be configured to allow a user to set which of a plurality of availability statuses is associated in an availability map with each of a plurality of different availability information indicators. The availability retrieval system may be configured to determine a current availability status by looking up the availability status which is indicated in the availability map as being associated with a current availability information indicator. The communication system may be configured to communicate with a network communication system.

At least one of the availability statuses may be representative of the availability status of a user of the communication device.

At least one of the availability statuses may be representative of the availability status of a service used by the communication device.

The availability information indicators may include at least one of a plurality of different designated types of entries in an electronic calendar. The availability map may include an association between each of the types of entries and one of the availability statuses.

The communication device may be a mobile communication device and may include a location determination system configured to determine the location of the mobile communication device. The availability information indicators may include at least one location of the communication device. The availability map may include an association between the location and one of the availability statuses.

The communication system may be configured to obtain social information from a social network server or an external social network site. The availability information indicators may include information derived from the social information. The availability map may include an association between the derived information and one of the availability statuses.

The communication system may be configured to obtain messaging information from a messaging server. The availability information indicators may include information derived from the messaging information. The availability map may include an association between the derived information and one of the availability statuses.

The communication system may be configured to cause the current availability status to be delivered to a presence server through the network communication system.

The availability retrieval system may be configured to request and obtain the current availability status from a presence server through the network communication system.

The communication device may include a data storage system configured to store a mode map that associates each of a plurality of availability statuses with one or more operational modes of the communication system. The user interface may be configured to allow a user to set which of the operational modes is associated in the mode map with each of the availability statues.

The data storage system and/or the presence server may store the availability map.

The communication device may include a mode controller configured to set the operational modes of the communication system in accordance with the operational modes indicated in the mode map to be associated with the current availability status, as determined by the availability retrieval system.

The user interface may include a ringer. One of the operational modes which is associated with one of the availability statues may be related to operation of the ringer.

The user interface may include a display. One of the operational modes which is associated with one of the availability statues may be related to what is displayed on the display.

The user interface may include a notification system. One of the operational modes which is associated with one of the availability statues may be related to a notification issued by the notification system.

The communication system may include a Wi-Fi transceiver. One of the operational modes which is associated with one of the availability statues may be related to actuation of the Wi-Fi transceiver.

The mode map and the mode controller may be in the same or in a different communication device as the availability retrieval system.

The presence server may be configured to receive and store the current availability status from a first communication device and to provide it upon request to a second communication device. The presence server may be configured to store the availability map. The presence server may be configured to receive and store the current availability information indicators from a first communication device or other external sources and to derive current availability status by applying the availability map, with derived availability status provided to a second communication device upon request.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIGS. 4A-4D each illustrate an example of a dialog box in which a user has mapped a selected location to an availability status.

FIGS. 6A-6D each illustrate an example of a dialog box in which a user has mapped a selected user availability status of a selected contact to at least one operational mode of the user's mobile communication device.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
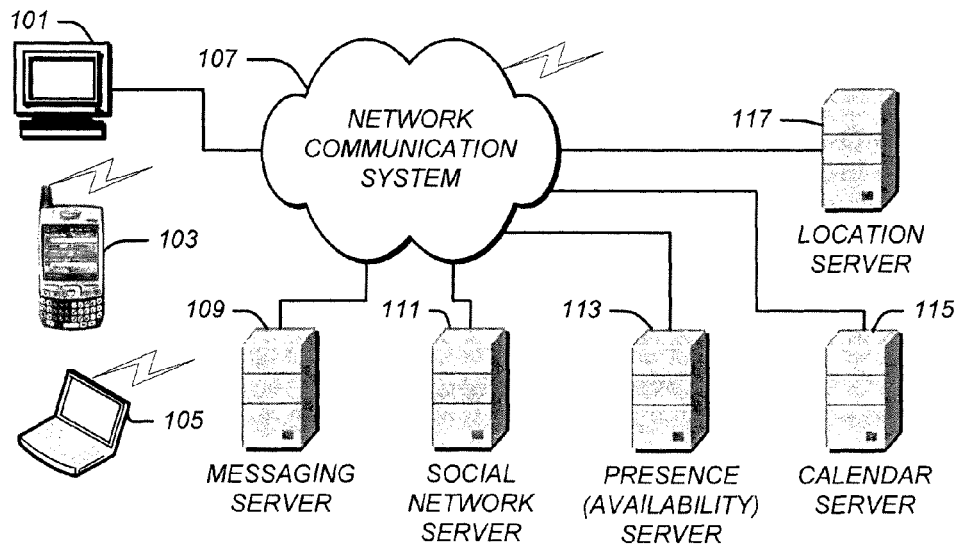
FIG. 1 illustrates an example of a communication system.

FIG. 1 illustrates an example of a communication system. The communication system may include a broad variety of components. These may include one or more communication devices which may be wired or wireless, such as the desktop computer 101, the smart phone 103, and the wireless laptop computer 105. The communication system may include a network communication system 107, a messaging server 109, a social network server 111, a presence (availability) server 113, a calendar server 115, and a location server 117. The communication system may include additional components and/or additional instances of the components which are illustrated in FIG. 1.

The network communication system 107 may be of any type. For example, it may consist of or include a cellular telephone/data network communication system, a telephone communication system, the Internet, a wide area network, a local area network, any other type of network communication system, or any combination of these. Details about other components in the communication system illustrated in FIG. 1 are provided below.

Figure 2:
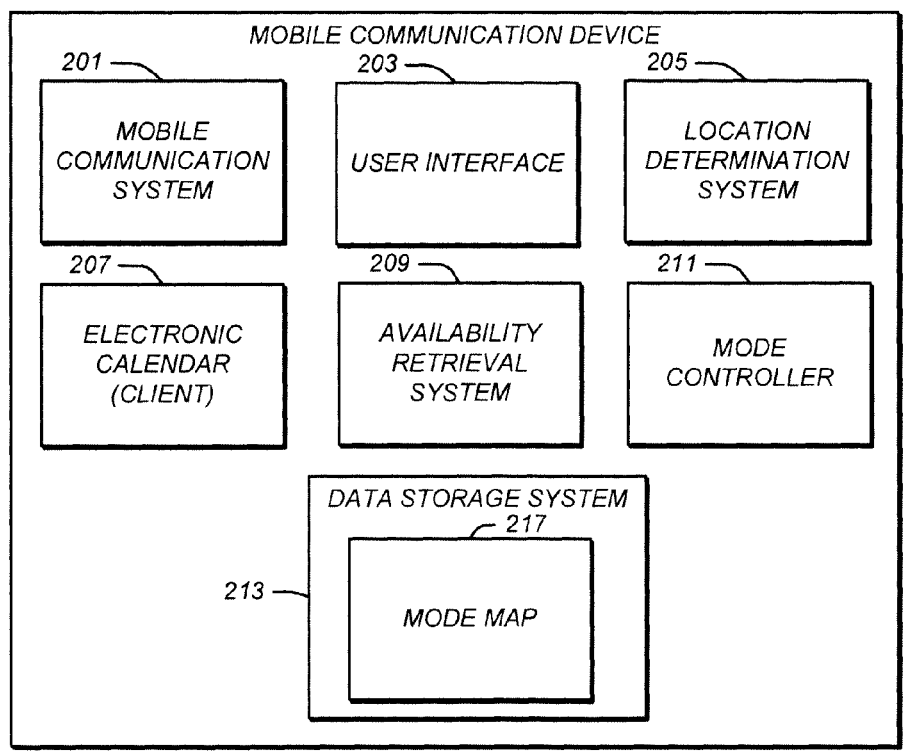
FIG. 2 illustrates an example of one of the mobile communication devices illustrated in FIG. 1.

FIG. 2 illustrates an example of one of the mobile communication devices illustrated in FIG. 1, such as the smart phone 103 and/or the wireless laptop computer 105. One or more of the mobile communication devices illustrated in FIG. 1 may have a configuration which is different than the one illustrated in FIG. 2. Similarly, the mobile communication device illustrated in FIG. 2 may be used in communication systems which are different from the one illustrated in FIG. 1.

As illustrated in FIG. 2, the mobile communication device may include a mobile communication system 201, a user interface 203, a location determination system 205, an electronic calendar client 207, an availability retrieval system 209, a mode controller 211, and a data storage system 213 which may contain a mode map 217.

The mobile communication system 201 may be configured to communicate through the network communication system 107 with various other communication devices, such as the messaging server 109, the social network server 111, the presence (availability) server 113, the calendar server 115, and the location server 117. The mobile communication system 201 may contain any technology configured to facilitate this communication. For example, the mobile communication system 201 may include one or more transceivers, antennas, data processing systems, memories, and user interface components.

The data storage system 213 may be of any type. For example, the data storage system 213 may include one or more flash memories, RAMS, ROMs, PROMS, e-PROMS, hard disk drives, CDs, and/or DVDs.

The electronic calendar client 207 may be configured to receive calendar entries and modifications to these entries from the user through the user interface. The calendar entries and their modifications may be stored on the calendar server 115, in the data storage system 213, and/or elsewhere.

An availability map may include data which associates each of a plurality of different availability information indicators with one of a plurality of availability statuses. The availability map may be stored in the presence (availability) server 113, in the data storage system 213, and/or elsewhere.

The mode map 217 may be data which the data storage system 213 is configured to receive, store, and modify in response to appropriate commands. The mode map 217 may include data which associates each of the plurality of availability statuses with one or more operational modes of the mobile communication system 201. The data in both the mode map 217 and the availability map may each be in the form of a database, such as a relational database. Examples of these availability information indicators, availability statuses, and operational modes are provided below.

The user interface 203 may be configured to allow a user to set which availability status is associated in the availability map with each of the availability information indicators. The user interface may also be configured to allow a user to set which of the operational modes is associated in the mode map 217 with each of the availability statuses.

The user interface 203 may be of any type. For example, the user interface may include one or more displays, keyboards, mice, touch pads, touch screens, microphones, loud speakers, and/or earphones, as well as smart sensors such as RFID readers, barcode scanners, magnetometers, etc.

The availability retrieval system 209 may be configured to determine a current availability status by looking up the availability status which is stored in the presence server 113 as being associated with a current availability information indicator. The current availability information indicator may be obtained from a source of current availability information indictors, examples of which are described below.

The mode controller may be configured to set the operational modes of the mobile communication system 201 in accordance with the operational modes indicated in the mode map 217 which are associated with the current availability status, as determined by the availability retrieval system 209.

One or more of the availability statuses may each be representative of the availability status of a user of the mobile communication device. These availability statuses may be of any type. For example, the availability statuses may consist of or include "Not available," "Available," Available only for friends," and/or "Available only for family." Different words may be used to instead describe the same statuses. Different availability statuses may also be described, such as "Do not disturb" and/or "On call."

The availability information indicators which are associated with the availability statuses in the availability map may each be indicative of an availability status. Examples are provided below.

The electronic calendar client 207 may be configured to cause different calendar entries of different designated types to be stored in the calendar server 115. For example, one or more calendar entries may be designated as a "Meeting," "Conference call," "Vacation," "Lunch," "Sleeping," "Traveling," "Movie," and/or "Party." Each designated type may be an availability information indicator. The selected types of calendar entries may be set by the system and/or the user. Additional or different types of calendar entries may be similarly mapped. Using the user interface 203 and the electronic calendar client 207, a user may map each designated type of calendar entry to one of the available statuses in the availability map.

FIGS. 3A-3D each illustrate an example of a dialog box in which a user has mapped a selected type of calendar entry to an availability status.

Figure 3A:
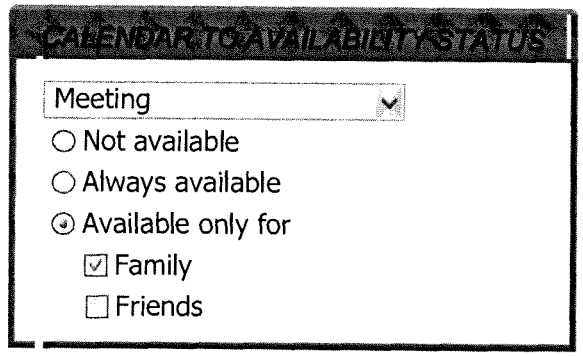
FIGS. 3A-3D each illustrate an example of a dialog box in which a user has mapped a selected type of calendar entry to an availability status.
Figure 3B:
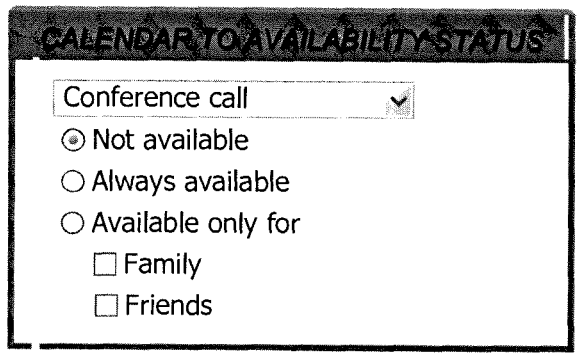
Figure 3C:
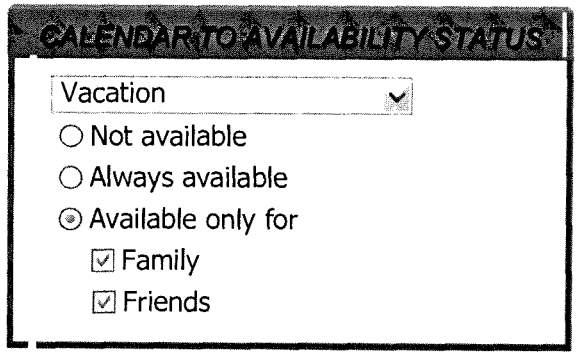
Figure 3D:
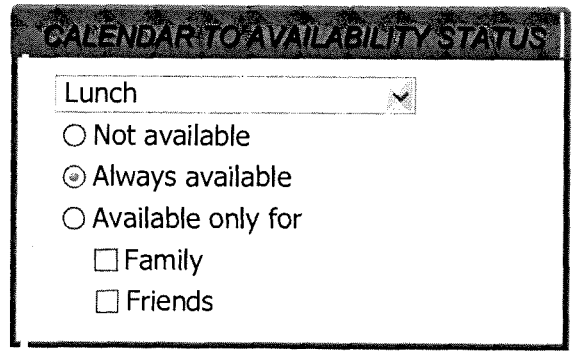

As illustrated in FIG. 3A, for example, the user has decided to map calendar entries designated as a "Meeting" to the availability status of "Available only for family." Similarly, the user has mapped calendar entries designated as "Conference call" to "Not available" in FIG. 3B, "Vacation" to "Available only for friends [and] families" in FIG. 3C, and "Lunch" to "Always available" in FIG. 3D. These mappings may be stored in the availability map.

The location determination system 205 may be configured to determine the location of the mobile communication device. The location determination system 205 may consist of or include any technology for this purpose. For example, the location determination system 205 may include a GPS receiver, and/or may use signal triangulation techniques or Wi-Fi Positioning Systems. The location determination system 205 may be configured to communicate with the location server 117 to obtain mappings between geographic coordinates and street addresses and/or landmarks.

The availability information indicators may include one or more locations of the mobile communication device, which may be in the form of street addresses. The availability map may include an association between each of these locations and one of the availability statuses.

FIGS. 4A-4D each illustrate an example of a dialog box in which a user has mapped a selected location to an availability status. As illustrated in FIG. 4A, for example, the user has decided to map the location "Office" to the availability status of "Always available." Similarly, the user has mapped the location of "Home" to "Available only for family [and] friends" in FIG. 4B, "Church" to "Not available" in FIG. 4C, and "Lunch" to "Available only for friend" in FIG. 4D. Additional or different locations may be similarly mapped, such as a particular stadium, airport, gym, theatre, and/or meeting room.

As indicated above, each of the mapped locations may constitute an availability information indicator. The actual coordinates and the radiuses of these mapped locations may in the first instance be determined by the location determination system 205 and/or through any other means. These location coordinates may be stored in the availability map as part of the availability information indicators, along with a name for each location.

One or more of the availability statuses may be representative of the availability status of a service used by the mobile communication device. For example, "Wi-Fi available" and "Wi-Fi not available" may be designated as availability statuses. In connection with these availability statuses, the availability information indicators may consist of or include a Wi-Fi signal indicator from a Wi-Fi transceiver which may be part of the mobile communication device, as well as a Wi-Fi connected indicator from a system in the mobile communication device which is used to automatically attempt a connection to a Wi-Fi hot spot. Other examples of availability statuses which may be representative of the availability status of a service which is used by the mobile communication device include availability per service or communication means such as video calling, voice calling, and instant messaging (IM). For example, a user is available for voice call but not video call, or a user is not available for phone conversation, but is available for IM chat.

Other types of information may in addition or instead be used as availability information indicators. For example, the mobile communication system 201 may be configured to obtain social information from one or more social network system servers, such as the social network server 111. Such servers may be configured to store information relevant to social networking. Examples include FaceBook and LinkedIn. The availability information indicators may include information derived from this social information, and the availability map may include an association between the derived information and one of the availability statuses.

For example, one availability information indicator which may be derived from social information may be whether the user is or is not checked into a hotel or a flight or whether the user is in a bad mood to communicate. This availability information indicator, in turn, may for example be mapped in the availability map to the availability status of "Online" (Available) or "Offline" (Unavailable).

The mobile communication system 201 may be configured to obtain messaging information from a messaging server, such as the messaging server 109. Examples of such messaging servers include email and instant message servers. The availability information indicators may include information derived from the messaging information, and the availability map may include an association between the derived information and one of the availability statuses.

For example, "Busy" on an external messaging platform (such as Yahoo Messenger) may be derived from messaging information as an availability information indicator. This may be mapped for example to the availability status of "Do Not Disturb" in the availability map 215.

Other examples of availability information indicators which may be mapped to availability statuses include "Invisible," "Away," "Offline," and/or "In A Meeting."

As indicate above, the mode controller 211 may be configured to set the operational modes of the communication system in accord with the operational modes indicated in the mode map 217 that are associated with the current availability status as, determined by the availability retrieval system 209.

Figure 5A:
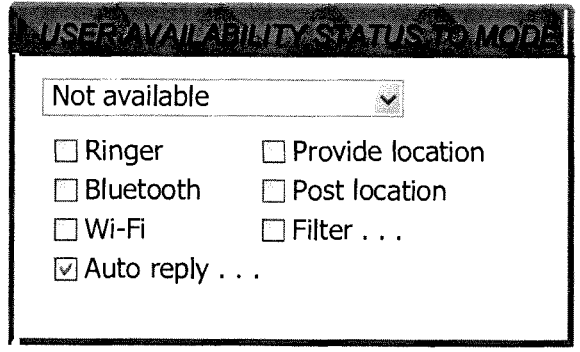
FIGS. 5A-5D each illustrate an example of a dialog box in which a user has mapped a selected user availability status to at least one operational mode of the user's mobile communication device.

FIGS. 5A-5D each illustrate an example of a dialog box in which a user has mapped a selected user availability status to at least one operational mode of the user's communication device. As illustrated in FIG. 5A, for example, the user has decided to map the availability status of "Not available" to the operational mode of "Auto reply . . . ". This operational mode may signify that a reply message is to be delivered automatically in response to an incoming communication, such as an incoming phone call or email message. Upon a user checking this operational mode option, a further dialogue box may open in which the user may enter the text of the auto reply. A voice recorder application may in addition or instead open in which the user may dictate an audible reply which is to automatically be provided. This may be a completely automated user experience such that a pre-recorded voice message or pre-entered text message may be selected by the system as the auto-reply message, as opposed to a user recording or typing in a message.

Figure 5B:
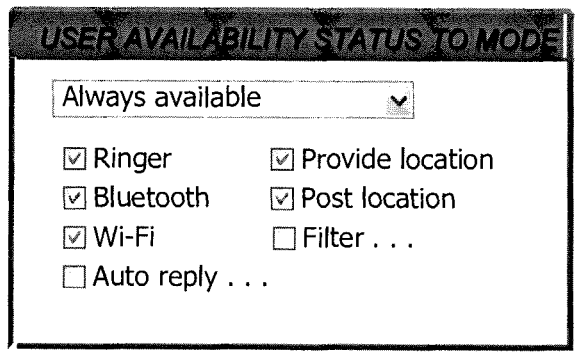
Figure 5C:
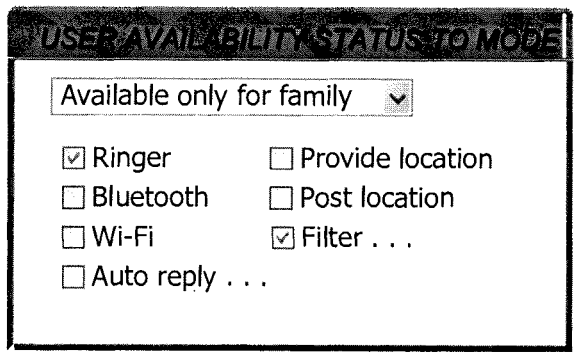
Figure 5D:
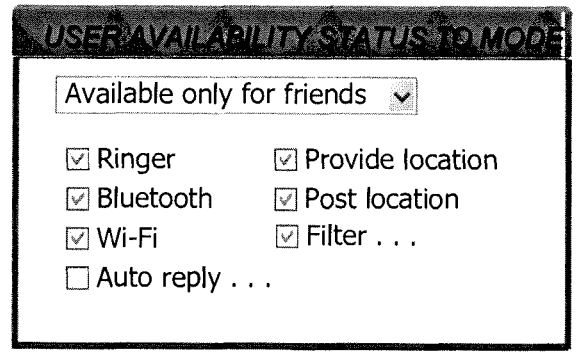

Similarly, the user has mapped the availability status of "Always available" to the operational modes of "Ringer", "Bluetooth," "Wi-Fi," "Provide location," and "Post location" in FIG. 5B, the availability status of "Available only for family" to "Ringer" and "Filter . . . " in FIG. 5C, and the availability status of "Available only for friends" to "Ringer," "Bluetooth," "Wi-Fi," "Provide location," "Post location," and "Filter . . . " in FIG. 5D. As suggested by these example mappings, a single availability status may be mapped to more than one operational mode change.

The "Ringer" option which is indicated in FIGS. 5A-5D as an available user selection may control the operational mode of a ringer. When checked, an audible ringer may sound upon receiving an incoming phone call and/or message. When unchecked, no audible sound may be provided. In other configurations, the volume and/or style of the ringer may be controlled, as well as other types of incoming communication notifications.

The "Bluetooth" and "Wi-Fi" options which are illustrated in FIGS. 5A-5D may activate a Bluetooth and Wi-Fi receiver, respectively, when checked, and deactivate them when not checked.

The "Provide location" option which is illustrated in FIGS. 5A-5D may be configured, when checked, to cause the communication device to include the user's location information in select or all outgoing messages based on the user's current availability status. This location information may enable others, including an incoming caller or message sender, to determine the location of the user.

The option "Post location" which is illustrated in FIGS. 5A-5D may be configured, when checked, to cause the current location of the user's communication device to be posted at an accessible location, such as to the social network server 111. This posting may occur when the availability status of the user changes to the availability status which is mapped to the "Post location" option in the mode map 217. This location information may enable others, including the members of the user's social circles, to determine the location of the user.

The "Filter . . . " option which is illustrated in FIGS. 5A-5D may be configured, when checked, to filter incoming communications so as to enable only ones from selected contacts to be prominently brought to the attention of the user of the communication device. Upon checking the "Filter . . . " option, a further dialogue box may open in which the user may specify the filter criteria, such as the names of contacts from whom incoming communications will or will not be prominently announced.

A broad variety of other types of operational modes may similarly be mapped to one or more of the availability statuses in addition or instead. These may include, for example, what or how information is displayed, such as the configuration of sequence of screens; what type of notifications are provided, such as in response to incoming communications; and whether incoming or outgoing video communications are permitted. Different home screens may be automatically chosen based on the time of the day (calendar), the user's current location, the identity of the incoming callers, and/or other information.

The mode controller 211 and its associated mode map 217 have thus-far been described as being part of the same mobile communication device which contains the availability map. In other configurations, the availability map may be in different communication devices or even in the network such as the presence server 113. The mobile communication system 201 which is contained in the communication device which contains the availability retrieval system 209, the mode controller 211 and its associated mode map 217, for example, may be configured to retrieve the current availability status, through a network communication system, such as the network communication system 107, and/or from a presence server, such as the presence (availability) server 113. The presence (availability) server 113 may be configured to proactively push the availability status to the communication system 201 that contains the mode controller 211 and its associated mode map 217, through a network communication system 107. These communications to or from the presence (availability) server 113 may take place periodically, each time there is a change in the availability status, upon user command, and/or in accordance with any other type of schedule.

The presence (availability) server 113 may be configured to receive and store the availability statuses which are received from multiple communication devices, along with information identifying the communication device which is associated with each availability status. The presence (availability) server 113 may be configured to provide the current availability status of a particular communication device in response to a request to the presence (availability) server 113 for such information.

The mobile communication system 201 which is contained in the different communication device which contains the mode controller 211 and its associated mode map 217, in turn, may be configured to request the availability status of one or more particular communication devices from the presence (availability) server 113. Each of such queries may be made at the time the communication device containing the mode controller 211 receives a communication from a communication device containing the availability retrieval system 209, upon user request, in accordance with a schedule, and/or in accordance with any type of criteria.

The types of operational modes that are mapped in the mode map 217 of this different communication device may be the same as or different than the types of operational modes which have been discussed above in connection with a communication device that contains both the availability retrieval system 209 and its associated availability map and the mode controller 211 and its associated mode map 217. One notable difference may be that the mode map 217 may include an identification of the remote communication device in connection with each availability status, thereby allowing the same availability status to affect the operational modes of the communication device differently, depending upon the remote communication device with which they are associated.

FIGS. 6A-6D each illustrate an example of a dialog box in which a user has mapped a selected user availability status of a selected contact to at least one operational mode of the user's communication device. As illustrated in FIGS. 6A-6D, the identity of each remote communication device which is mapped in the mode map 217 may be specified by the name of the person which is associated with that remote communication device in a contact database. As illustrated in FIG. 6A, for example, the user has decided to map the remote communication device associated with contact "John Smith" when his availability status is "Always available" to the operational mode of "Provide notification . . . ". When this operational mode is selected for this availability status of this contact person, the system may be configured to open a dialogue box which allows the user to specify the particular type of notification which is to be provided to the user when receiving a communication from this remote communication device.

Similarly, the user has decided to map the availability status of "Not available" of "John Smith" to "Send a message . . . " in FIG. 6B; "Not available" for "Jack Johnson" to "Auto reply . . . " In FIG. 6C; and "Available only for family" for "Jack Johnson" to "Loud ringer" in FIG. 6D.

The "send message . . . " option which is illustrated in FIGS. 6A-6D may be configured to send a message to the designated contact (or to a group of contacts), for example, when the availability status of the designated contact changes to the specified availability status. When selected, the system may open a dialogue box in which the user may specify the text of the message or a voice recorder which may allow the user to record an audible message that is in addition or instead to be sent.

The "Auto reply . . . " option which is illustrated in FIGS. 6A-6D may be configured to send an automated reply to an incoming communication, just as was discussed above in connection with FIGS. 5A-5D.

The "Loud ringer" option which is illustrated in FIGS. 6A-6D may be configured to increase the volume of the ringer when receiving an incoming communication from the designated contact person while having the designated availability status.

Other types of operational mode options may be specified in addition or instead, such as any of the other types of operational modes discussed above. Operational modes that may be uniquely applicable to this type of contact-based operational mode mapping, for example, may also be provided, such as personalized notifications and invocation of local and/or remote applications.

Unless otherwise indicated, the communication devices and servers which have been discussed herein may each be implemented with a computer system configured to perform the functions which have been described herein for the component. The servers may include one or more computers at the same or different locations. When at different locations, the computers may be configured to communicate with one another through a wired and/or wireless network communication system. Each computer system include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, mice, displays, microphones, sound reproduction systems, and/or touch screens). Unless otherwise indicated, each computer system may be a personal computer, mainframe, workstation, single user system, multi-user system, server, portable computer, hand-held device, cell phone, smart cell phone, tablet, or part of a larger system, such as vehicle, appliance, and/or telephone system. Each computer system may include software (e.g., one or more operating systems, device drivers, application programs, and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, one or more of the availability information indicators may come from sources which are external to the mobile communication device, such as from networked applications.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:
1. A communication device comprising:
a user interface configured to allow a user to set which of a plurality of availability statuses is associated in an availability map with each of a plurality of different availability information indicators;
an availability retrieval system configured to retrieve a current availability status by looking up the availability status which is indicated in the availability map as being associated with a current availability information indicator;

a communication system configured to communicate with a network communication system;

a data storage system configured to store a mode map that associates each of a plurality of availability statuses with one or more operational modes of the communication system;

wherein the user interface is further configured to allow a user to set which of the operational modes is associated in the mode map with each of the availability statuses; and a mode controller configured to set the operational modes of the communication system in accordance with the operational modes indicated in the mode map to be associated with the current availability status as determined by the availability retrieval, system.

2. The communication device of claim 1 wherein at least one of the availability statuses is representative of the availability status of a user of the communication device.

3. The communication device of claim 1 wherein at least one of the availability statuses is representative of the availability status of a service used by the communication device.

4. The communication device of claim 1 wherein the availability information indicators include at least one of a plurality of different designated types of entries in an electronic calendar, and the availability map includes an association between each of the types of entries and one of the availability statuses.

5. The communication device of claim 1 wherein the communication device is a mobile communication device and includes a location determination system configured to determine the location of the communication device, the availability information indicators include at least one location of the communication device, and the availability map includes an association between the at least one location and one of the availability statuses.

6. The communication device of claim 1 wherein the communication system is configured to obtain social information from a social network system server, the availability information indicators include information derived from the social information, and the availability map includes an association between the derived information and one of the availability statuses.

7. The communication of claim 1 wherein the communication system is configured to obtain information from a messaging server, the availability information indicators include information derived from the messaging information, and the availability map includes an association between the derived information and one of the availability statuses.

8. The communication device of claim 1 wherein the communication system is configured to cause the current availability status to be delivered to a presence server through the network communication system.

9. The communicator device of claim 1 wherein the availability retrieval system configured to request and obtain the current availability status from a presence server through the network communication system.

10. The communication device of claim 1 wherein the user interface includes a ringer and one of the operational modes which is associated with one of the availability statuses is related to operation of the ringer.

11. The communication device of claim 1 wherein the user interface includes a display and one of the operational modes which is associated with one of the availability statuses is related to what is displayed on the display.

12. The communication device of claim 1 wherein the user interface includes a notification system and one of the operational modes which is associated with one of the availability statuses is related to a notification issued by the notification system.

13. The communication device of claim 1 wherein the communication system in the communication device includes a Wi-Fi transceiver and one of the operational modes which is associated with one of the availability statuses is related to actuation of the Wi-Fi transceiver.

14. The communication device of claim 1 wherein the communication device includes a location determination system configured to determine the location of the communication device, and one of the operational modes which is associated with one of the availability statuses is related to the location determined by the location determination system.

15. A communication system comprising:
a first communication device comprising:
a first user interface configured to allow a user to set which of a plurality of availability statuses is associated in an availability map with each of a plurality or different availability information indicators; and
a first communication system configured to communicate with a network communication system and to deliver the availability map to the network communication system; and a second communication device different from the first communication device comprising:
a second communication system configured to communicate with the network communication system and to request and receive the current availability status from the network communication system;
a data storage system configured to store a mode map that associates each of the availability statuses with one or more operational modes of the second communication system;
a second user interface configured to allow a user to set which of the operational modes is associated in the mode map with each of the availability statuses; and
a mode controller configured to set the operational modes of the second communication system in accordance with the operational modes indicated in the mode map to be associated with the current availability status as received by the second communication system; and a third communication system comprising:
a networked application server configured to produce and deliver one or more availability information indicators to the network communication system.

16. The communication system of claim 15
further comprising a presence server configured to receive and store the availability map from the first communication device, to apply the availability map to the availability information indicators received from the third communication system to generate the current availability status, and to provide the current availability status upon request to the second communication device;
wherein the first communication system is configured to cause the current availability map to be delivered to the presence server through the network communication system;
wherein the second communication system is configured to request and obtain the current availability status from the presence server through the network communication system; and wherein the third communication system is configured to cause the current availability information indicators to be delivered to the presence server through the network communication system.

17. The communication system of claim 16 wherein the presence server is configured to store the availability map and the current availability status.

* * * * *